S. S. FORSTER.
SHAFT BEARING.
APPLICATION FILED JUNE 28, 1913.
1,115,185.
Patented Oct. 27, 1914.
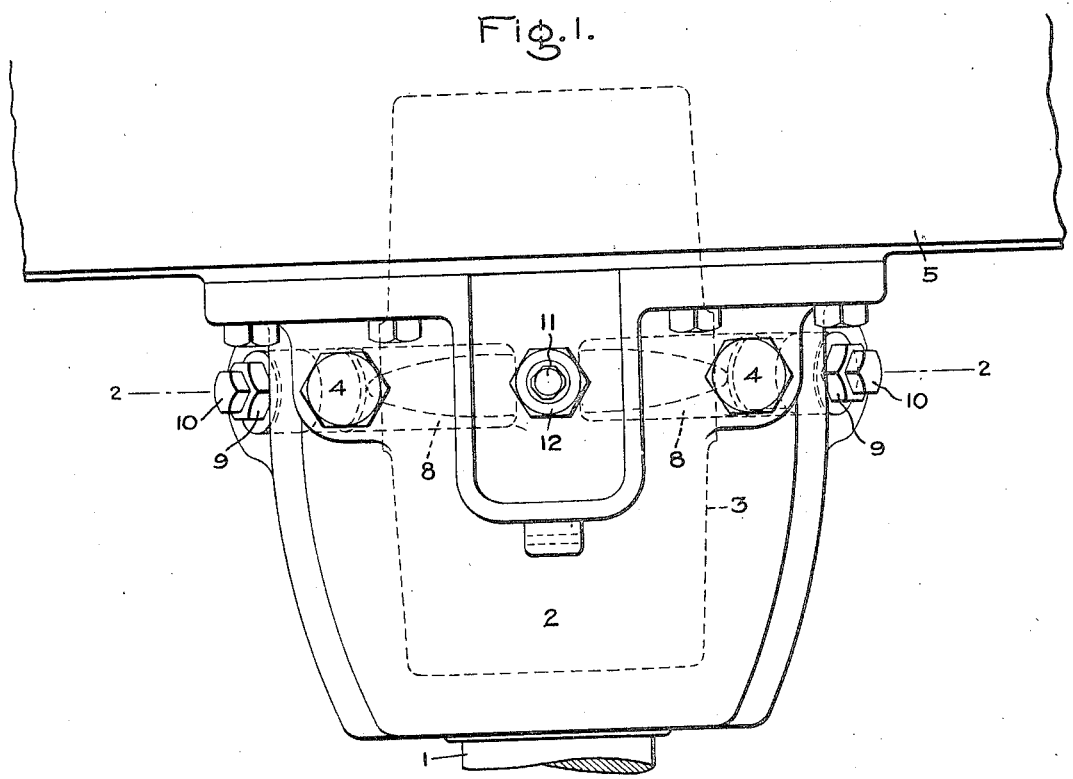
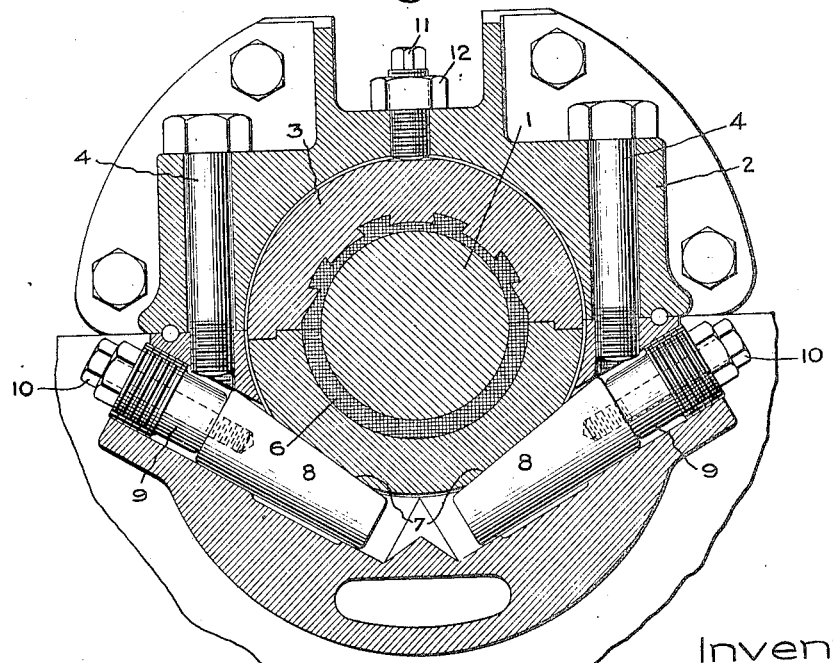
Witnesses:
Marcus L. Byng.
J. Ellis Glen.
Inventor:
Samuel S. Forster,
by Albert G. Davis
His Attorney.

UNITED STATES PATENT OFFICE.

SAMUEL S. FORSTER, OF SCHENECTADY, NEW YORK, ASSIGNOR TO GENERAL ELECTRIC COMPANY, A CORPORATION OF NEW YORK.

SHAFT-BEARING.

1,115,185.  Specification of Letters Patent.  Patented Oct. 27, 1914.

Application filed June 28, 1913. Serial No. 776,400.

*To all whom it may concern:*

Be it known that I, SAMUEL S. FORSTER, a citizen of the United States, residing at Schenectady, county of Schenectady, State of New York, have invented certain new and useful Improvements in Shaft-Bearings, of which the following is a specification.

My invention relates to shaft bearings and is particularly applicable to bearings of dynamo electric machines. In such machines, in which the rotating element is quite heavy, the wear of the bearings causes the air gap below the rotating element to be decreased and the air gap above the rotating element to be increased.

My invention has for its object, to provide, in machines in which this is likely to occur and especially in machines having small air gaps, such as induction motors, novel means for easily and quickly centering the rotating element.

To this end, my invention consists in certain features of novelty which will be pointed out with particularity in the claims annexed to and forming a part of this specification.

For a better understanding of my invention, reference may be had to the following description taken in connection with the accompanying drawing, in which—

Figure 1 is a plan view of a shaft bearing embodying my invention, and Fig. 2 is a section on the line 2—2 of Fig. 1.

Referring to the drawing, 1 is a shaft, on which may be mounted the rotating element of a dynamo electric machine, and which is journaled in a bearing having a housing 2 and a sleeve 3. The housing is shown as being divided into two parts fastened together by bolts 4 and bolted to the frame 5 of a dynamo electric machine. The sleeve 3 may be divided into two parts and provided with a suitable antifriction bearing material 6, such as Babbitt. These parts may take any usual or well known form.

In accordance with my invention, the external dimensions of sleeve 3 are slightly less than the internal dimensions of the housing 2, and the exterior surface of the sleeve 3 has two flattened portions 7 on the under side thereof, which are engaged by flattened wedge surfaces of cylindrical members 8 whereby the sleeve may be moved relatively to the housing. The sleeve 3 is supported substantially at its center on the members 8. The members 8 have a cylindrical seat in the housing 2, and consequently the sleeve 3 together with the members 8 may rotate slightly on the seats of the members 8. From this it will be seen that my bearing is a self alining bearing. These wedge members are preferably moved by means of adjustable studs 9 and bolts 10. The bolts 10 pass through the studs 9 and are screwed into the wedge members 8. The studs 9 are screwed into the housing 2.

If, when the machine is erected, the air gap above the rotating element is too small and that below the rotating element is too large, the shaft 1 and with it, the rotating element, may be lowered by loosening the bolts 10, then withdrawing the studs 9, and finally screwing up the bolts 10 again so as to withdraw the wedge members 8 from under the sleeve 3 and into engagement again with the studs 9. An adjusting screw 11 provided with a lock nut 12 is then screwed inwardly to engage the upper ends of the sleeve 3 so to hold the sleeve 3 in its new position. If the bearing material 6 wears, so that the rotating element, and with it, its shaft 1, sinks below its central position, causing the air gap above the rotating element to become too large, and that below the rotating element to become too small, the shaft and the rotating element may be raised by loosening the adjusting screw 11 and the bolts 10, screwing in the studs 9 so as to force the wedge member 8 inwardly, and then tightening up the bolts 10 and the adjusting screw 11 with its lock nut 12. It is to be noted that if one or the other of the sides of the bearing material 6 wears, the sleeve 3 may be moved sidewise by withdrawing one of the wedge members 6 and forcing the other of the wedge members inwardly.

I desire it to be understood that my invention is not limited to the particular arrangement shown and described and aim in the appended claims to cover all modifications which do not depart from the spirit and scope of my invention.

What I claim as new and desire to secure by Letters Patent of the United States, is:—

1. In combination, a shaft, a bearing therefor comprising a housing and a sleeve, the external dimensions of said sleeve being slightly less than the internal dimensions of said housing whereby said sleeve may be moved within said housing, the exterior surface of said sleeve having flattened portions on the under side thereof, and cylindrical members having flattened wedge surfaces engaging said flattened portions of the surface of said sleeve whereby said sleeve may be moved relatively to said housing, said sleeve being supported substantially at its center on said cylindrical members, said cylindrical members having cylindrical seats in said housing.

2. In combination, a shaft, a bearing therefor comprising a housing and a sleeve, the external dimensions of said sleeve being slightly less than the internal dimensions of said housing whereby said sleeve may be moved within said housing, the exterior surface of said sleeve having flattened portions on the under side thereof, cylindrical members having flattened wedge surfaces engaging said flattened portions of the surface of said sleeve, said sleeve being supported substantially at its center upon said cylindrical members, said cylindrical members having cylindrical seats in said housing, and means for changing the positions of said cylindrical members so as to move said sleeve relatively to said housing.

3. In combination, a shaft, a bearing therefor comprising a housing and a sleeve, the external dimensions of said sleeve being slightly less than the internal dimensions of said housing whereby said sleeve may be moved within said housing, the exterior surface of said sleeve having flattened portions on the under side thereof, cylindrical members having flattened wedge surfaces engaging said flattened portions of the surface of said sleeve, said sleeve being supported substantially at its center on said cylindrical members, said cylindrical members having cylindrical seats in said housing, studs screwed into said housing, and means for moving said cylindrical members into engagement with said studs.

4. In combination, a shaft, a bearing therefor comprising a housing and a sleeve, the external dimensions of said sleeve being slightly less than the internal dimensions of said housing whereby said sleeve may be moved within said housing, the exterior surface of said sleeve having flattened portions on the under side thereof, cylindrical members having flattened wedge surfaces engaging said flattened portions of the surface of said sleeve, said sleeve being supported substantially at its center on said cylindrical members, said cylindrical members having cylindrical seats in said housing, and adjustable studs engaging said cylindrical members whereby said sleeve may be moved relatively to said housing.

5. In combination, a shaft, a bearing therefor comprising a housing and a sleeve, the external dimensions of said sleeve being slightly less than the internal dimensions of said housing whereby said sleeve may be moved within said housing, the exterior surface of said sleeve having flattened portions on the under side thereof, cylindrical members having flattened wedge surfaces engaging said flattened portions of the surface of said sleeve, said sleeve being supported substantially at its center on said cylindrical members, said cylindrical members having cylindrical seats in said housing, studs screwed into said housing, and means engaging said cylindrical members for moving said cylindrical members into engagement with said studs.

6. In combination, a shaft, a bearing therefor comprising a housing and a sleeve, the external dimensions of said sleeve being slightly less than the internal dimensions of said housing whereby said sleeve may be moved within said housing, the exterior surface of said sleeve having flattened portions on the under side thereof, cylindrical members having flattened wedge surfaces engaging said flattened portions of the surface of said sleeve, said sleeve being supported substantially at its center on said cylindrical members, said cylindrical members having cylindrical seats in said housing, studs screwed into said housing, and bolts passing through said studs and screwed into said cylindrical members for moving said cylindrical members into engagement with said studs.

In witness whereof, I have hereunto set my hand this 27th day of June, 1913.

SAMUEL S. FORSTER.

Witnesses:
 HELEN ORFORD,
 MARGARET E. WOOLLEY.